United States Patent [19]
Furukawa et al.

[11] 4,120,928
[45] Oct. 17, 1978

[54] PRODUCTION OF BIAXIALLY STRETCHED FILM OF POLYAMIDE BLEND

[75] Inventors: Kaoru Furukawa, Takatsuki; Koichi Matsunami, Otsu; Toshihiko Ota, Otsu; Tetsushi Murakami, Otsu; Hiroshi Nagai, Otsu; Kazuo Tamaki, Otsu, all of Japan

[73] Assignee: Toyo Boseki Kabushiki Kaisha, Osaka, Japan

[21] Appl. No.: 788,047

[22] Filed: Apr. 15, 1977

[30] Foreign Application Priority Data

Apr. 19, 1976 [JP] Japan .................................. 51-44689
May 8, 1976 [JP] Japan .................................. 51-52559
May 8, 1976 [JP] Japan .................................. 51-52561
May 10, 1976 [JP] Japan .................................. 51-53685
May 10, 1976 [JP] Japan .................................. 51-53686
Aug. 5, 1976 [JP] Japan .................................. 51-93830
Aug. 9, 1976 [JP] Japan .................................. 51-95277

[51] Int. Cl.² ............................................. B29D 7/24
[52] U.S. Cl. .......................... 264/171; 260/857 TW; 264/210 R; 264/289; 264/290 N
[58] Field of Search ............... 264/289, 290 N, 210 R, 264/171; 260/857 TW

[56] References Cited
U.S. PATENT DOCUMENTS

| | | | |
|---|---|---|---|
| 3,637,906 | 1/1972 | Parathoen | 264/289 |
| 3,652,759 | 3/1972 | Schlemmer et al. | 264/289 |
| 3,843,479 | 10/1974 | Matsunami et al. | 264/289 |
| 3,968,071 | 7/1976 | Miyamoto et al. | 260/857 TW |

OTHER PUBLICATIONS

"An Investigation of the Structures of Polyamide Series"-Kinoshita-Die Makro Molecular Chemie, 33, 1 (1959), pp. 1-20.

*Primary Examiner*—Jeffery R. Thurlow
*Attorney, Agent, or Firm*—Jones, Tullar & Cooper

[57] ABSTRACT

A process for preparing a biaxially stretched film of a polyamide blend, which comprises (1) melt extruding a polyamide blend to make an unstretched film and (2) stretching the unstretched film first in the machine direction and then in the transverse direction, or (2') stretching the unstretched film first to make a uniaxially stretched film having a plane orientation index of about 0.6 to 1.7 and then stretching the uniaxially stretched film in a direction substantially at a right angle to the direction at the previous stretching, said polyamide blend comprising 97 to 80% by weight of an α-type aliphatic polyamide (Component A) and 3 to 20% by weight of at least one polyamide (Component B) selected from the group consisting of (i) an α-type aliphatic polyamide different from the Component A, (ii) a γ-type aliphatic polyamide, (iii) a non-crystalline aliphatic polyamide, and (iv) a ring-containing polyamide which contains in the molecule 0 to 50 mol % of repeating units comprising a xylylenediamine residue.

25 Claims, 1 Drawing Figure

Plane orientation index of film stretched in machine direction

Figure 1

PRODUCTION OF BIAXIALLY STRETCHED FILM OF POLYAMIDE BLEND

The present invention relates to the production of a biaxially stretched film of polyamide blend. More particularly, it relates to the production of a stretched film of a polyamide blend by sequential biaxial stretching of an unstretched film of polyamide blend containing an α-type aliphatic polyamide as the main component.

It is well known that biaxial stretching of an unstretched film of a thermoplastic polymer in directions at right angles to each other generally affords a stretched film having excellent physical properties, such as mechanical strength and gas-permeability, and that such biaxial stretching may be effected by either simultaneous biaxial stretching or sequential biaxial stretching. It is also well known that it is difficult to achieve a uniformly stretched film by sequential biaxial stretching an aliphatic polyamide such as nylon 6 or nylon 6.6 (Japanese Patent Publication No. 9399/1968). As to simultaneous biaxial stretching, it is difficult to obtain a film with uniform thickness by an inflation process in which air is blown into a film in the tube form to achieve stretching. Further, in a process in which simultaneous biaxial stretching is effected in a tender while holding with clips, an expensive, complicated apparatus is required and the speed of the film-formation is hardly raised.

Under these circumstances, various methods for sequential biaxial stretching of an unstretched film of an aliphatic polyamide have been hitherto proposed in order to overcome the said drawbacks. For example, Japanese Patent Publication No. 2195/1962 proposes the incorporation of monomers or oligomers into polyamides comprising aliphatic polyamides and the sequential biaxial stretching of an unstretched film of the resulting mixture. By such method, however, various problems such as adhesion of the additives to rollers are caused during the film-formation, and the resultant film has less strength and size-stability and possesses increased gas-permeability and electric conductivity because of the presence of the monomers and oligomers. The following methods also have been proposed: stretching in one direction and then rolling in the vertical direction (Japanese Patent Publication Nos. 5986/1963 and 12496/1964); preventing crystallization of a film on roll-stretching (Japanese Patent Publication No. 3195/1972); providing a longitudinally stretched film with grooves (Japanese Patent Publication No. 8868/1973); etc. These methods each have various disadvantages.

The present inventors have previously disclosed a process for biaxial stretching of a polyamide film (Japanese Patent Application No. 21703/1976, U.S. Ser. No. 711,613). Applicants have found, after further study that, although sequentially uniform, biaxially stretched films of aliphatic polyamides, such as nylon 6, nylon 6.6 and nylon 6.10, which form an α-form (or β-form) crystal under the crystallization conditions described hereinafter (these alphatic polyamides are, hereinafter, referred to as "α-type aliphatic polyamides"), have been previously considered difficult to achieve, that uniform, sequentially biaxially stretched films can be achieved from a combination of these α-type aliphatic polyamides with aliphatic polyamides which form a γ-form crystal under the crystallization conditions described hereinafter (e.g., nylon 6.9, nylon 7.7 and nylon 12) (these aliphatic polyamides are, hereinafter, referred to as "γ-type aliphatic polyamides"); a non-crystalline aliphatic polyamide; or a ring containing polyamide which contains 0 to 50 mol % of repeating units comprising a xylylenediamine residue.

On the basis of this new finding, it has now been found that the desired biaxially stretched film of polyamide blends can be prepared by using a polyamide blend comprising 97 to 80% by weight of an α-type aliphatic polyamide (Component A) and 3 to 20% by weight of a polyamide (Component B) selected from (i) an α-type aliphatic polyamide different from the Component A, (ii) a γ-type aliphatic polyamide (iii) a non-crystalline aliphatic polyamide, and (iv) a ring-containing polyamide which contains in the molecule 0 to 50 mol % of repeating units comprising a xylylenediamine residue, and by stretching an unstretched film of the polymer blend first to make a uniaxially stretched film having a plane orientation index of about 0.6 to 1.7 and then stretching the uniaxially stretched film in a direction substantially at a right angle to the direction at the previous stretching.

Melt-extrusion of blends of different kinds of polyamides has hitherto been studied in order to improve the properties of nylon fibers. For instance, the following methods are known: spinning a blend of a polyamide having a low melting point and a polyamide having a high melting point to give a fiber having a melting point of higher than 230° C. and being able to be ironed (U.S. Pat. No. 2,193,529), melt-spinning a mixture of a polycapramide or polyhexamethylene adipamide and 5 to 50% by weight of a polyhexamethylene isophthalamide or polyhexamethylene 5-t-butylisophthalamide in order to eliminate the problem of flat spots in tires made from a tire cord of nylon 6 or nylon 6.6 (Japanese Patent Publication No. 7889/1966, U.S. Pat. No. 3,195,603), melting-spinning a mixture of a polycapramide or polyhexamethylene adipamide and 5 to 80% by weight of a polyamide having a glass transition point of higher than 140° C. (Japanese Patent Publication No. 17083/1965, U.S. Pat. No. 3,393,252), and melt-spinning a mixture of a polycapramide or polyhexamethylene adipamide and 5 to 40 parts by weight of a polyhexamethylene isophthalamide copolymer in order to improve the nerve of nylon 6 or nylon 6.6 fibers (Japanese Patent Publication No. 11830/1968). However, these methods aim to improve the size-stability and Young's modulus of the nylon fibers, but do not teach or even suggest the improvement of the stretching properties of the stretched film of polyamide blends as in the present invention.

The important point herein is that the orientation character of α-form crystals of the aliphatic polyamide formed in the film after uniaxial stretching, particularly in the machine direction, has a great influence on the stretchability in the vertical direction, particularly in transverse direction.

Up to the present time, the sequential biaxial stretching of aliphatic polyamides has encountered extreme difficulty and therefore not been practised on an industrial scale. This is due to the fact that kink bands are readily formed on stretching in the transverse direction, which is carried out subsequently to the stretching in the machine direction in the initial stage.

Based on the thinking that the formation of kink bands is facilitated and the stretchability in a second direction, particularly in a traverse direction is reduced, because the film formed by stretching in the first direction, particularly the machine direction, has its crystal lattice planes regularly arranged to the film surface, investigations were carried out and it was confirmed that, in a film containing more than about 97% by weight of the α-type aliphatic polyamide to be used in the invention and stretched in one direction, particularly in machine direction, the hydrogen bonded sheets of α-form crystals of the aliphatic polyamide are arranged regularly to the film surface thereby causing the formation of kink bands on subsequent transverse stretching, which not only causes breaking of the film but also produces stretching spots whereby the resultant film is not uniform in physical properties and its appearance is greatly reduced. Also it has been also confirmed that with decrease of the content of the α-type aliphatic polyamide in the polyamide blend (less than 97% by weight), the regular arrangement of the crystal lattice planes to the film surface of the film stretched in one direction, especially in machine the direction, is prevented, thereby greatly improving the stretchability in a vertical direction, especially in transverse direction, which permits the realization of the sequential biaxial stretching without adopting the specific processes described in Japanese Patent Publication Nos. 8868/1973 and 3195/1972 and Japanese Patent Publication (unexamined) No. 55679/1975.

The present invention provides a process for preparing a biaxially stretched film of a polyamide blend, which comprises melt extruding a polyamide blend to make an unstretched film and stretching the unstretched film, first in one direction, and then in a direction substantially at a right angle to the direction at the previous stretching, said polyamide blend comprising 97 to 80% by weight of an α-type aliphatic polyamide (Component A) and 3 to 20% by weight of a polyamide (Component B) selected from (i) an α-type aliphatic polyamide different from the Component A (ii) a γ-type aliphatic polyamide, (iii) a non-crystalline aliphatic polyamide and (iv) a ring-containing polyamide which contains in the molecule 0 to 50 mol % of repeating units comprising a xylylenediamine residue.

The Polyamide blends containing less than 80% by weight of the α-type aliphatic polyamide is excluded from the polyamide blend used in the present invention, because it can be stretched by sequential biaxial stretching without specifying the plane orientation index of the film stretched in machine direction and further the physical properties of the film varied owing to the α-type aliphatic polyamide.

The aliphatic polyamide used in the present invention includes any aliphatic polyamide which forms an α-form crystal (according to the classification as described in Macromol. Chem., 33, 1 (1959) by Y. Kinoshita) such as polyamides (e.g. nylon 4, nylon 6, nylon 9, nylon 11, nylon 6.6, nylon 6.10 nylon 10.10) or copolymers thereof or a mixture thereof. Suitable examples of the α-type aliphatic polyamides as the Component A are an α-type aliphatic polyamide comprising mainly ε-caprolactam, and an α-type aliphatic polyamide comprising mainly hexamethylene adipamide. Suitable examples of the α-type aliphatic polyamide as the Component B, which must be different from those of Component A, are nylon 6, nylon 6.6, nylon 6.10, nylon 11, a copolymer, comprising the monomeric constituents of those polymers, which forms α-form crystals. The γ-type aliphatic polyamides include any aliphatic polyamide which forms a γ-form crystal (according to the classification as described in Macromol. Chem., 33, 1 (1959) by Y. Kinoshita) such as polyamides (e.g. nylon 7.6, nylon 6.7, nylon 7.7, nylon 6.9, nylon 8, nylon 8.9, nylon 7.10, nylon 9.9, nylon 10, nylon 12) or copolymers thereof or a mixture thereof. Particularly suitable examples of the γ-type aliphatic polyamide are nylon 6.7, nylon 6.9, nylon 12 and a copolymer of those polymers, which forms α-form crystals. The non-crystalline aliphatic polyamides include any aliphatic polyamide which is not crystallized under the crystallization conditions as mentioned hereinafter, such as terpolymers and tetrapolymers, i.e., copolymers comprising three or four different kinds of monomers being capable of forming a polyamide, which can be prepared by copolymerizing a lactam having 6 to 12 carbon atoms and/or a combination of at least one aliphatic diamine and at least one aliphatic dicarboxylic acid. Suitable examples of non-crystalline aliphatic polyamides are a terpolymer comprising 20 to 50% by weight of ε-caprolactam, 20 to 60% by weight of hexamethylenediammonium adipate (or sebacate) and 10 to 50% by weight of laurolactam, and a terpolymer comprising 20 to 50% by weight of ε-caprolactam, 10 to 60% by weight of hexamethylenediammonium adipate (or sebacate) and 20 to 50% by weight of trimethylhexamethylenediammonium sebacate (or adipate).

The ring-containing polyamide used as Component B, (iv) contains (10 to 50 mol % of metaxylylenediamine component containing 0 to 30 mol % of paraxylylenediamine component, (2) 0 to 100 mol % of a heterocyclic or alicyclic diamine component and (3) 0 to 100 mol % of an aromatic or alicyclic dicarboxylic acid component, said ring-containing components (1), (2) and/or (3) are contained in an amount of at least 20 mol % in total. The remaining components of the ring-containing polyamide are one or more aliphatic diamine components, one or more aliphatic dicarboxylic acid components and optionally one or more components derived from one or more lactams.

Examples of the aliphatic diamine used as the component for the aliphatic polyamide or ring-containing polyamide are ethylenediamine, propylenediamine, butylenediamine, pentamethylenediamine, hexamethylenediamine, heptamethylenediamine, octamethylenediamine, nonamethylenediamine, decamethylenediamine, undecamethylenediamine, dodecamethylenediamine, 2-methylhexamethylenediamine, 3-methylhexamethylenediamine, 2,2,4-trimethylhexamethylenediamine, 2,4,4-trimethylhexamethylenediamine, neopentylglycolbispropylamine, ethyleneglycolbispropylamine, or the like. The aliphatic diamines contain usually 2 to 12 carbon atoms.

Examples of the aliphatic dicarboxylic acid used as the component for the aliphatic polyamide or ring-containing polyamide are succinic acid, glutaric acid, adipic acid, pimelic acid, suberic acid, azalaic acid, sebacic acid, 2- methyladipic acid, 3-methyladipic acid, tert.-butyladipic acid, decanedionic acid, undecanedionic acid, dodecanedionic acid, tridecanedionic acid, tetradecanedionic acid, pentadecanedionic acid, hexadecanedionic acid, eicosanedionic acid, dicarboxylic acid of linderic acid dimer, dicarboxylic acid of oleic acid dimer, or the like. The aliphatic dicarboxylic acids contains usually 4 to 36 carbon atoms, preferably 6 to 12 carbon atoms.

Examples of the heterocyclic or alicyclic diamine are piperazine, N-aminoethylpiperazine, N,N'-bisaminopropylpiperazine, cyclohexanebismethylamine, bis(-para-aminocyclohexyl)methane, or the like.

As the aromatic dicarboxylic acid, terephthalic acid and isophthalic acid are particularly suitable from the viewpoints of economic and excellent properties thereof, but there may be used other aromatic dicarboxylic acids, such as 5-tert.-butylisophthalic acid, naphthalenedicarboxylic acid, biphenyldicarboxylic acid, 3-(4-carboxyphenyl)-1,1,3-trimethyl-5-indanedicarboxylic acid, or a dicarboxylic acid of the formula: HOOC-$\phi$-X-$\phi$-COOH wherein $\phi$ is phenylene, X is —O—, $=SO_2$ or $=CR_1R_2$, and $R_1$ and $R_2$ are each hydrogen, an alkyl having 1 to 5 carbon atoms or may combine with each other to form an alkylene having 4 to 5 carbon atoms. Examples of the alicyclic dicarboxylic acid are hexahydroterephthalic acid, hexahydroisophthalic acid, hexahydrophthalic acid, or the like. When the aromatic dicarboxylic acid or alicyclic dicarboxylic acid is contained excess over 90 mol % as the dicarboxylic acid component, the copolymer shows an extremely high melt viscosity, and hence, the polymerization and the melt mixing is unfavorably difficult. When the xylylenediamine content is over 50 mol % in the diamine component, undesirable fish-eye occurs in the film owing to the deterioration of the polymer by heat. These ring-containing polyamides may contain a substituent (e.g. an alkyl group or a halogen atom) on the ring.

Suitable examples of the ring-containing polyamide used as Component B are a copolyamide containing 70 mol % or more of the repeating units constituted with (a) 0 to 80 mol % of $\epsilon$-caprolactam, (b) 3 to 100 mol % of units comprising at least one aliphatic diamine and at least one aromatic dicarboxylic acid and/or alicyclic dicarboxylic acid and (c) 0 to 70 mol % of units comprising metaxylylenediamine containing 0 to 30 mol % of paraxylylenediamine and at least one aromatic dicarboxylic acid and/or alicyclic dicarboxylic acid; a copolyamide wherein the component (b) constituting the copolyamide repeating units as above-mentioned consists of 65 mol % or more of units comprising 2,2,4-trimethylhexamethylenediamine and/or 2,4,4-trimethylhexamethylenediamine and terephthalic acid, and the components (a) and (c) are totally 35 mol % or less; a copolyamide containing 70 mol % or more of repeating units prepared from with (a) 0 to 80 mol %, more preferably 20 to 50 mol %, of $\epsilon$-caprolactam, (b) 0 to 50 mol %, more preferably 10 to 40 mol %, of units comprising metaxylylenediamine containing 0 to 30 mol % of paraxylylenediamine and at least one aliphatic dicarboxylic acid having 4 to 12 carbon atoms, and (c) 0 to 70 mol %, more preferably 20 to 70 mol %, of a member selected from the group consisting of i) units comprising at least one aliphatic diamine having 2 to 12 carbon atoms and at least one aliphatic dicarboxylic acid having 4 to 36 carbon atoms, more preferably 6 to 12 carbon atoms, ii) units comprising at least one aliphatic diamine having 2 to 12 carbon atoms and at least one aromatic dicarboxylic acid and/or alicyclic dicarboxylic acid, and iii) units comprising metaxylylenediamine and at least one aromatic dicarboxylic acid and/or alicyclic dicarboxylic acid;

a copolyamide containing 70 mol % or more of repeating units prepared from (a) 5 to 80 mol %, more preferably 15 to 65 mol %, of units comprising $\epsilon$-caprolactam or units comprising at least one aliphatic diamine and at least one aliphatic dicarboxylic acid (e.g. hexamethylene adipamide), (b) 0 to 90 mol %, more preferably 15 to 75 mol %, of units comprising at least one aliphatic diamine and isophthalic acid, and (c) 0 to 80 mol %, more preferably 10 to 60 mol %, of units comprising at least one aliphatic diamine and terephthalic acid;

a copolyamide containing 70 mol % or more of the repeating units prepared from (a) 3 to 80 mol %, more preferably 20 to 50 mol %, of $\epsilon$-caprolactam, (b) 3 to 80 mol %, more preferably 20 to 40 mol %, of units comprising at least one aliphatic diamine having 2 to 12 carbon atoms and at least one aliphatic dicarboxylic acid having 4 to 36 carbon atoms, and (c) 3 to 90 mol %, more preferably 40 to 70 mol %, of units comprising at least one diamine and at least one aromatic dicarboxylic acid and/or alicyclic dicarboxylic acid; and a copolyamide containing 70 mol % or more of the repeating units prepared from amine components consisting of (a) 3 to 70 mol %, more preferably 10 to 50 mol %, (in the amine components) of metaxylylenediamine containing 0 to 30 mol % of paraxylylenediamine and (b) 97 to 30 mol %, more preferably 90 to 50 mol %, (in the amine components) of at least one aliphatic diamine having 2 to 12 carbon atoms, and carboxylic acid components consisting of (c) 10 to 97 mol %, more preferably 20 to 90 mol %, (in the carboxylic acid components) of at least one aliphatic dicarboxylic acid having 4 to 36 carbon atoms and (d) 90 to 3 mol %, more preferably 80 to 10 mol %, (in the carboxylic acid components) of at least one aromatic dicarboxylic acid or alicyclic dicarboxylic acid.

The polyamide blend may contain, in addition to the said essential components, any additive such as other polymers, antistatic agents, lubricants, anti-fogging agents, anti-blocking agents, stabilizers, dyestuffs and pigments.

These components should have enough viscosity in melt so that the blend can be melt-extruded to give a uniform film surface, but too high viscosity is not desirable because of the difficulty in the extrusion procedure, and hence, the components have preferably a relative viscosity of 1.6 to 4.0.

The mixing of the components to be used in the invention may be effected by any appropriated procedure. In usual, these components in chip state are admixed by the aid of any blender such as a V-form blender, and the blend is then melted and shaped.

An unstretched film of polyamide blend may be prepared by a melt method such as the T-die method or the inflation method. This film is substantially non-oriented. When the film formation is effected by a melt method using a T-die, for example, the polyamide blend is heated to a temperature higher than the melting temperature thereof, extruded through the T-die into the film form and cooled with a roll or a liquid. The temperature of the roll or the liquid is desired to be kept below 80° C., preferably between 20° and 80° C. because the stretchability of the film is lowered with increase of the temperature, for instance, even unstretched film is not obtained or the unstretched film loses clarity.

The sequential biaxial stretching according to the invention will be hereinafter explained in detail. The explanation is concerned with the case where the stretching is effected first in the machine direction and then in transverse direction, but this is also applicable to the sequential biaxial stretching where the stretching is effected first in transverse direction and then in the machine direction.

As the result of further investigations on the above mentioned points, it has been confirmed that, depending on the mixing proportion of the $\alpha$-type aliphatic polyamide in the polyamide blend of the invention and the combination of the cooling conditions at the extrusion of the melted polyamide blend into a film form (mainly the chill roll temperature) with the conditions in the subsequent stretching the machine direction (mainly the stretching temperature and the draw ratio), the plane orientation index indicating the orientation character to the film surface of α-form crystals of the aliphatic polyamide formed in the film stretched in machine direction is varied to a considerable extent, and when the value comes close to about 1.0, the formation of kink bands is prevented to improve further the stretchability in the subsequent stretching in transverse direction.

Figure 1:
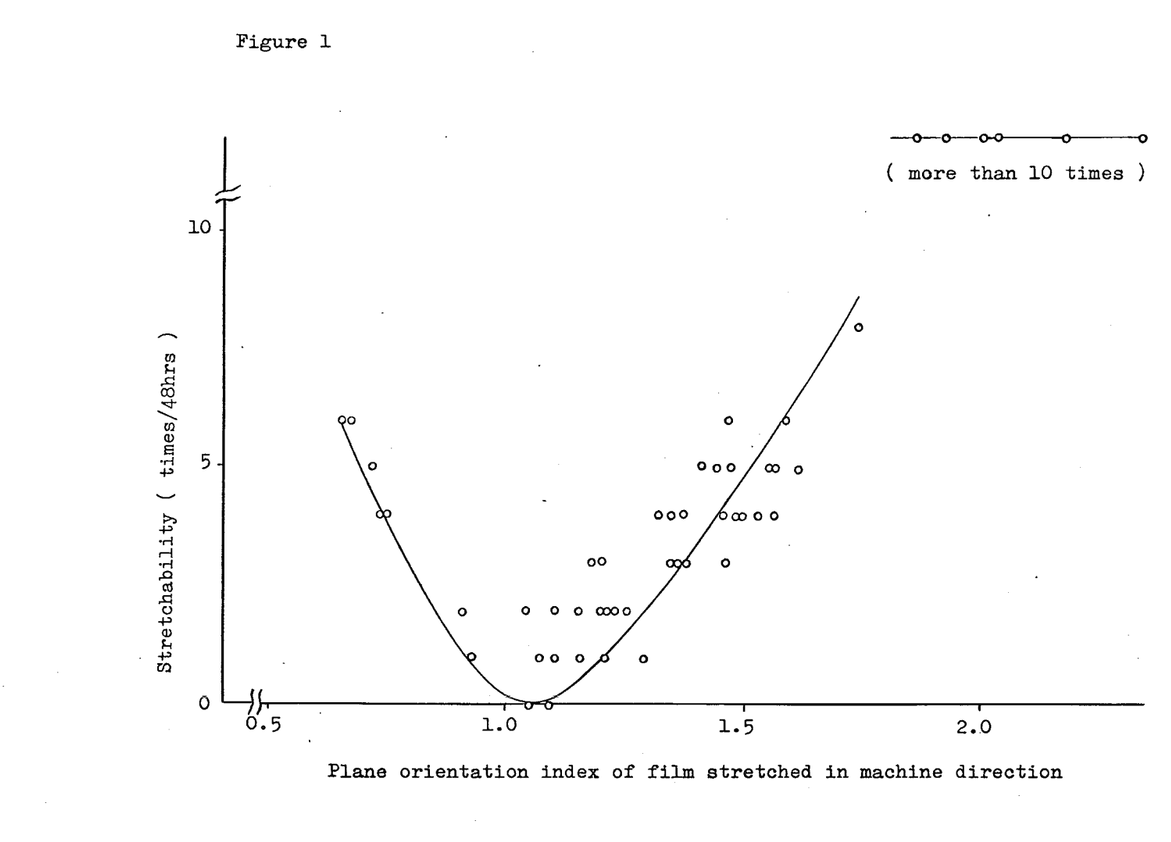

FIG. 1 in the accompanying drawing is a graph showing a relationship between the plane orientation index of the film stretched in machine direction which is varied depending on the kind of the polyamide blend and the conditions in the film-formation and the stretchability in transverse direction. From this Figure, it is understood that an industrially adoptable stretchability can be obtained when the plane orientation index is in the range of about 0.6 to 1.7, preferably about 0.8 to 1.3. Thus, the mixing proportion of the polyamide and the conditions in the film-formation are desired to be so determined that the plane orientation index comes in the said range.

The term "stretchability" herein used means the degree of facility on the transverse stretching of the film stretched in the machine direction. It can be determined by transverse stretching of the film stretched in the machine direction by the use of an apparatus usually employed in industrial production under the conditions designed for obtaining a biaxially stretched film with uniform quality. Judgement is made depending on the number of times of the film break per unit time.

The unstretched film is subjected to sequential biaxial stretching.

The temperature during the stretching in the machine direction is usually above the glass transition point of the unstretched film and below about 130° C., preferably from 50 to 130° C., more preferably from about 50° to 110° C. When the stretching temperature is lower than the glass transition temperature, an extremely high stress is needed for accomplishment of the stretching, and sometimes breaking of the film or the loss of clarity in the film occurs. Thus, stretching with a high draw ratio becomes difficult. When the stretching temperature is higher than about 130° C., the desirable stretched (in the machine direction) film having an effective orientation is difficult to obtain because of the deformation due to the flowing of molecular chain thereof.

The temperature during the stretching in transverse direction may ordinarily be higher than that at the stretching in the machine direction and lower than about 160° C. Preferred and practical temperature is in the range between about 70° to 160° C., more preferably between about 80° and 130° C. In case of the temperature being lower than that as adopted at the stretching in machine direction, even stretching becomes difficult, and the thickness of the stretched film is made uneven, because of extremely large stretching stress for stretching the film stretched in the machine direction, which was orientated and crystallized in the machine direction, at a right angle to the direction at the previous stretching. Where the temperature is higher than about 160° C., a stretched film having excellent physical properties is difficult to obtain, because of occurrence of the flowing of molecular chain in the non-crystallized part with slipping at the crystal surface.

During the stretching the machine direction and in transverse direction, the draw ratio is to be from about 2 to 6. In case of the draw ratio being less than about 2, the resultant film tends to possess stretching spots and to show unevenness in thickness. Besides, it becomes difficult to give sufficient orientation to the film. The draw ratio during the stretching in the machine and transverse directions is preferably 2 to 5, respectively, and when it exceeds about 6, breaking of the film is produced.

The biaxially stretched film of polyamide blend prepared as above has good properties by itself. When desired, it may be further stretched in machine or transverse direction in order to enhance the physical properties in a specific direction.

To provide the stretched film with improved thermal stability, it may be optionally subjected to heat treatment at a temperature about 5° C. higher than the temperatures during the stretching in the machine and transverse directions and lower than the melting point of the film for a period of time not longer than about 5 minutes, preferably from about 5 to 60 seconds. During the heat treatment, the film may be maintained at the state of constant length, relaxation or elongation or their combination. As the result of such heat treatment, the crystallization degree of the film is increased, the distortion produced in the film during the stretching step is eliminated and the mechanical properties and the size stability of the film are improved.

The resultant film has an excellent crystallinity and balanced characteristics in the machine and transverse directions.

According to the present invention, the desired biaxially stretched film of a polyamide blend comprising predominantly an α-type aliphatic polyamide can easily and industrially be produced by sequential biaxial stretching and the film thus produced has excellent transparency, mechanical strength, softness, gas-permeability, heat resistance, and impact strength at low temperature, which are characteristic properties in the biaxially stretched film of nylon 6 and nylon 6.6. Moreover, the film has excellent tensile strength and gage uniformity in comparison with the film produced by simultaneous biaxial stretching. The biaxially stretched film produced by the present invention usually has a thickness of 1 to 1000μ (particularly 10 to 500μ), a tensile stregth at break of 15 to 30 kg/mm² and an impact strength of 6 to 15 kg. cm/25μ. Accordingly, the biaxially stretched film produced by the present invention is useful as packaging materials for various products, such as cooked foods, meat products, marine products, processed vegetable and fruit products, and frozen foods, and is also widely used for industrial materials, electrical materials, materials for metal deposition. When desired, the film of the present invention may be subjected to various treatments suitable for these various usages, such as surface treatment, coating, lamination, printing, or the like.

For complete understanding the invention, detailed explanation will be hereinafter made on several technical terms employed in this specification and on the procedures of determination of the physical properties described in the following Examples.

(1) Method for distinguishing the α-type and γ-type aliphatic polyamides:

The aliphatic polyamide to be tested is molten and thereafter is isothermically crystallized for 30 minutes at a temperature between the melting temperature of the polyamide and the temperature lower than the melting temperature by 30° C., the obtained solid product is subjected to the X-ray analysis at room temperature and the formation of α-form crystals and γ-form crystals is examined according to the chassification by Y. Kinoshita (Macromol. Chem., 33 1, 1959).

(2) Method for distinguishing the non-crystalline aliphatic polyamides:

The aliphatic polyamide having no melting point is isothermically crystallized for 30 minutes at a temperature higher than the glass transition point thereof. The obtained solid product is subjected to the X-ray analysis at room temperature. The non-crystalline polyamides are observed no reflaction of crystals.

(3) The plane orientation index of uniaxially stretched film:

In the α-form crystals of the aliphatic polyamide formed in the uniaxially stretched film, the molecular chain axis is arranged in the direction of uniaxial orientation, and further the hydrogen bonded sheet shows a biaxial orientation parallel or vertical to the film surface and a uniaxial orientation equidirected to the film surface depending on the conditions of the film-formation. For simply representing these orientation states, a plane orientation index is defined by the following equation using the two strong diffraction intensities from the equatorial plane of the α-form crystals of the aliphatic polyamide obtained by irradiating the uniaxially stretched film with X-ray vertically:

$$\text{Plane orientation index} = K \times \frac{\text{Diffraction intensity from equatorial plane having a peak at a spacing of 4.3 to 4.5 Å}}{\text{Diffraction intensity from equatorial plane having a peak at a spacing of 3.6 to 3.8 Å}} \quad (1)$$

In this equation, the constant K is a reverse numeral of the second term of the equation (1) in the uniaxially oriented specimen and can be readily determined from the diffraction intensity of each crystal plane subjected to crystal analysis or the measured value in the uniaxially oriented specimen (for instance, fiber specimen). In case of nylon 6, the value of K is 1.62, and in case of nylon 6.6, the value is 1.72. In case of a mixture of two or more α-type aliphatic polyamides, the value of K is calculated by the equation: $K = \Sigma K_i W_i$ wherein $K_i$ and $W_i$ are K and the mixed ratio of the α-type aliphatic polyamide of the number "i", respectively. The physical meaning of the plane orientation index is as follows: When its value comes close to 1.0, a uniaxial orientation is indicated; when the value is larger than 1.0, a biaxial orientation where the hydrogen bonded sheet is parallel to the film surface is indicated; and when the value is smaller then 1.0, a biaxial orientation where the hydrogen bonded sheet is vertical to the film surface is indicated.

(4) Procedure for determining the plane orientation index:

Since, in the uniaxially stretched film taken out from the operation step, there are present, in addition to α-form crystals, meso-states (for instance, smectic hexagonal state) which are converted into α-form crystals under heating and show thereby a biaxial orientation, the estimation should be effected including these factors. The determination of the plane orientation index is therefore carried out using as a specimen the film stretched in machine direction taken out from the operation step and subjected to treatment with boiling water for 30 minutes in a state of original lengthfixation. The X-ray determination is effected by the aid of Rota-Flex manufactured by Rigaku Denki K. K. under CuKα-ray, as the X-ray source, obtained by filtering with Ni the X-ray generated under the conditions of a tube voltage of 45 KV and a tube current of 70 mA. For detection of the X-ray intensity, a scintillation counter is employed. The slit system is as follows: divergence slit, (1°/6) × (1°/6); scattering slit, (1°/6); receiving slit, 0.3 mm.

The following is an explanation on the operation for analysis of the plane orientation index of the film stretched in machine direction. Firstly, the surface of the film stretched in machine direction after treatment with boiling water is irradiated with X-ray vertically and the curve of X-ray diffraction intensity in the equatorial direction is determined by the permeation method under the condition: $2\theta = 13° = 33°$. From the curve, the X-ray diffraction intensity curve from the non-crystallized part is eliminated, and the integral intensities of the two strong diffractions from the equatorial plane of α-form crystals of the aliphatic polyamide, i.e., the ones having a peak at a spacing of 4.3 to 4.5 Å and of 3.6 to 3.8 Å, respectively, are measured. From the thus measured values, calculation is made by the equation (1) to obtain the plane orientation index. The integral intensity is determined by drawing the intensity curve of low angle side to the peak position in case of the diffraction from the equatorial plane with a spacing of 4.3 to 4.5 Å or of high angle side to the peak position in case of the diffraction from the equatorial plane with a spacing of 3.6 to 3.8 Å symmetrically to each peak position and measuring the produced area. As the above mentioned X-ray diffraction intensity curve from the non-crystallized part, the one in the direction having an angle of about 45° to the equatorial direction which is not influenced by the diffraction from the crystals is employed.

(5) Stretchability:

The film formed is stretched for 48 hours under the conditions described in the following Examples and the number of times of film break caused on the stretching is employed as the criterion for the estimation.

(6) Relative viscosity ($\eta_{rel}$):

The determination is effected using 96% sulfuric acid under a concentration of 1 g/dl at 25° C. by the aid of Ostwald's viscosimeter.

(7) Melting point:

The calorie absorption temperature is measured by the use of a differential calorimeter made by Perkin Elmer Co. with a temperature elevation of 20° C./minute.

(8) Glass transition point:

The calorie absorption temperature of a sheet-like test piece prepared by melting a chip between two heated plates and then rapidly cooling is measured by the use of a differential calorimeter made by Perkin Elmer Co. with a temperature elevation of 20° C./minute.

(9) Haze:

Determination is effected according to JIS-K 6714 by the aid of a hazeometer of S-type manufactured by Toyo Seiki K. K., and from the values of the total amount of permeating light (A) and the amount of diffused light (A.B), the calculation is made by the following equation:

$$\text{Haze} = (A.B)/A \times 100 \, (\%)$$

(10) Yield strength; Yield elongation in tension:

Determination is effected according to ASTM-D 882.

(11) Tensile strength at break; Elongation at break: Young's modulus:

Determination is effected according to ASTM-D 882 in the machine and transverse directions using a specimen of 50 mm in length and 10 mm in width by the aid of a largesized Tension UTM-3 manufactured by Toyo Sokki K. K. under a tensile velocity of 100 mm/min. The Youns's modulus is obtained by calculation from the initial inclination of the stressdistortion curve.

(12) Impact strength:

Determination is effected by the aid of a film impact tester manufactured by Toyo Seiki K. K. under atmosphere of 20° C. and a relative humidity of 65%, and the measured value is converted into the one per 25 μ in thickness. The impact strength at low temperature is measured at −30° C.

(13) Oxygen-permeability:

Determination is effected by the use of an automatic oxygen-permeability determining apparatus (Oxtran-100, manufactured by Modern Control Co., in U.S.A.) by an isotactic method at 30° C. under a relative humidity of 0% and 90%.

EXAMPLE 1

Poly-ε-caprolactam ($\eta_{rel}$ = 3.1) as the α-type aliphatic polyamide and polyhexamethylene azelamide (nylon 6.9) and polylaurolactam (nylon 12) as the α-type aliphatic polyamide are admixed in a chip state in a proportion as shown in Tables 1 and 2. The mixture is heated at 275° C. and melt-extruded by the aid of an extruder of 60 mm in diameter having a T-die onto a chill roll kept at a designed temperature as shown in Table 5 for cooling to obtain an unstretched film having a thickness of about 210μ and a width of 25 cm. The unstretched film is then guided to a longitudinal stretching machine comprising multiple rolls being 110 mm in roll diameter and 700 mm in width at velocity of 3 m/min and stretched in machine direction between the rolls with different peripheral speeds under the conditions shown in Tables 1 and 2. Then, the film is guided into a transverse stretching tenter being about 3 m in width and about 11 m in length and stretched at 95° C. in a direction vertical to the lengthwise direction of film with a draw ratio of 3.7. The plane orientation index of the film stretched in machine direction and the transverse stretchability are shown in Tables 1 and 2.

Table 2

| Mixing proportion of polymers | | Temp. of chill roll (° C) | Stretching in machine direction | | Plane orientation index | Stretchability |
|---|---|---|---|---|---|---|
| Ny 6*¹ | Ny 12*² | | Temp. (° C) | Draw ratio | | |
| 80 | 20 | 20 | 55 | 3.5 | 1.15 | 2 |
| 80 | 20 | 20 | 70 | 3.5 | 1.44 | 5 |
| 80 | 20 | 20 | 90 | 3.5 | 1.61 | 5 |
| 90 | 10 | 20 | 60 | 3.5 | 0.92 | 1 |
| 90 | 10 | 20 | 70 | 3.5 | 1.20 | 3 |
| 95 | 5 | 20 | 55 | 3.5 | 0.65 | 6 |

[Note]:
*¹Ny 6: Poly-ε-caprolactam
*²Ny 12: Polylaurolactam

EXAMPLE 2

Poly-ε-caprolactam ($\eta_{rel}$ = 3.1) as the α-type aliphatic polyamide and terpolymers [A]* and [B]** as the non-crystalline aliphatic polyamide are admixed in a chip state in a proportion as shown in Tables 3 and 4. The mixture is melt-extruded to obtain an unstretched film, followed by stretching in machine direction under the conditions as shown in Tables 3 and 4 and then stretching in transverse direction in the same manner as described in Example by the use of the same extruder and stretching machine as used in Example 1 to give a biaxially stretched film. The results are shown in Tables 3 and 4.

[Remarks]:

[A]* . . . Terpolymer A which is a terpolymer produced by copolymering ε-caprolactam (30% by weight), hexamethylenediammonium adipate (30% by weight) and laurolactam (40% by weight).

[B]* . . . Terpolymer B which is a terpolymer produced by copolymerizing ε-caprolactam (30% by weight), hexamethylenediammonium sebacate (30% by weight) and trimethylhexamethylenediammonium sebacate (40% by weight).

Table 3

| Mixing proportion of polymers | | Temp. of chill roll (° C) | Stretching in machine direction | | Plane orientation index | Stretchability |
|---|---|---|---|---|---|---|
| Ny 6¹ | A | | Temp. (° C) | Draw ratio | | |
| 80 | 20 | 20 | 55 | 3.5 | 0.90 | 2 |
| 80 | 20 | 20 | 70 | 3.5 | 1.85 | More than 10 |
| 80 | 20 | 20 | 90 | 3.5 | 1.59 | 6 |
| 90 | 10 | 20 | 60 | 3.5 | 1.18 | 3 |
| 95 | 5 | 20 | 55 | 3.5 | 0.67 | 6 |

[Note]:
*¹Ny 6: Poly-ε-caprolactam
*²A: Terpolymer A

Table 1

| Mixing proportion of polymers | | Temperature of chill roll (° C) | Stretching in machine direction | | Plane orientation index | Stretchability |
|---|---|---|---|---|---|---|
| Ny 6*¹⁾ | 6.9*²⁾ | | Temperature (° C) | Draw ratio | | |
| 80 | 20 | 20 | 55 | 3.5 | 1.04 | 2 |
| 80 | 20 | 20 | 70 | 3.5 | 1.49 | 4 |
| 80 | 20 | 20 | 90 | 3.5 | 1.73 | 8 |
| 90 | 10 | 20 | 60 | 3.5 | 1.10 | 2 |
| 90 | 10 | 20 | 70 | 3.5 | 1.35 | 3 |
| 95 | 5 | 20 | 55 | 3.5 | 0.71 | 5 |

[Note]:
*¹⁾Ny 6 : Poly-ε-caprolactam
*²⁾Ny 6.9: Polyhexamethylene azelamide

Table 4

| Mixing proportion of polymers | | Temperature of chill roll (°C) | Stretching in machine direction | | Plane orientation index | Stretchability |
|---|---|---|---|---|---|---|
| Ny 6*1) | B*2) | | Temperature (°C) | Draw ratio | | |
| 80 | 20 | 20 | 55 | 3.5 | 1.37 | 4 |
| 80 | 20 | 20 | 70 | 3.5 | 1.99 | More than 10 |
| 80 | 20 | 20 | 90 | 3.5 | 1.46 | 6 |
| 90 | 10 | 20 | 60 | 3.5 | 1.10 | 1 |
| 95 | 5 | 20 | 55 | 3.5 | 0.73 | 4 |

[Note]:
*1)Ny 6: Poly-ε-caprolactam
*2)B: Terpolymer B

EXAMPLE 3

Poly-ε-caprolactam ($\eta_{rel} = 3.1$) as the α-type aliphatic polyamide and poly(trimethylhexamethylene terphthalamides) [D]*, [E] and [F]* as the ring-containing polyamide are admixed in a chip state in a proportion as shown in Tables 5 to 8. The mixture is melt-extruded to obtain an unstretched film, followed by stretching in machine direction under the conditions as shown in Tables 5 to 8 and then stretching in transverse direction in the same manner as in Example 1 by the use of the same extruder and stretching machine as used in Example 1 to give a biaxially stretched film. The results are shown in Tables 5 to 8.

[Remarks]:

[D]* . . . Terpolymer D which is a terpolymer produced by copolymerizing ε-caprolactam (10% by weight), hexamethylenediammonium terephthalate (10% by weight) and hexamethylenediammonium isophthalate (80% by weight).

[E]** . . . Terpolymer E which is a terpolymer produced by copolymerizing ε-caprolactam (30% by weight), hexamethylenediammonium adipate (35% by weight) and 4,4'-methanebiscyclohexylammonium adipate (35% by weight).

[F]*** . . . Copolymer F which is a copolymer produced by copolymerizing 1,3-cyclohexanebismethylammonium adipate (13% by weight) and ε-caprolactam (87% by weight).

Table 5

| Mixing proportion of polymers | | Temperature of chill roll (°C) | Stretching in machine direction | | Plane orientation index | Stretchability |
|---|---|---|---|---|---|---|
| Ny 6*1) | B*2) | | Temperature (°C) | Draw ratio | | |
| 80 | 20 | 20 | 55 | 3.5 | 1.55 | 5 |
| 80 | 20 | 20 | 70 | 3.5 | 1.48 | 4 |
| 90 | 10 | 20 | 60 | 3.5 | 1.05 | 0 |
| 90 | 10 | 20 | 70 | 3.5 | 1.29 | 1 |
| 95 | 5 | 20 | 55 | 3.5 | 0.74 | 4 |

[Note]:
*1)Ny 6: Poly-ε-caprolactam
*3)C: Poly(trimethylhexamethylene terephthalamide)

Table 6

| Mixing proportion of polymers | | Temperature of chill roll (°C) | Stretching in machine direction | | Plane orientation index | Stretchability |
|---|---|---|---|---|---|---|
| Ny 6*1) | B*2) | | Temperature (°C) | Draw ratio | | |
| 80 | 20 | 20 | 70 | 3.5 | 1.46 | 3 |
| 80 | 20 | 20 | 90 | 3.5 | 1.20 | 2 |
| 90 | 10 | 20 | 60 | 3.5 | 1.37 | 3 |
| 90 | 10 | 20 | 70 | 3.5 | 1.15 | 1 |

[Note]:
*1)Ny 6: Poly-ε-caprolactam
*2)D: Terpolymer D

Table 7

| Mixing proportion of polymers | | Temperature of chill roll (°C) | Stretching in machine direction | | Plane orientation index | Stretchability |
|---|---|---|---|---|---|---|
| Ny 6*1) | E*2) | | Temperature (°C) | Draw ratio | | |
| 80 | 20 | 20 | 70 | 3.5 | 1.91 | More than 10 |
| 90 | 10 | 20 | 60 | 3.5 | 1.47 | 5 |
| 95 | 5 | 20 | 55 | 3.5 | 1.34 | 4 |

[Note].
*1)Ny 6: Poly-ε-caprolactam
*Terpolymer E

Table 8

| Mixing Proportion of polymers | | Temp. of chill roll (°C) | Stretching in machine direction | | Plane orientation index | Stretchability |
|---|---|---|---|---|---|---|
| Ny 6*1) | F*2) | | Temp. (°C) | Draw ratio | | |
| 80 | 20 | 20 | 70 | 3.5 | 2.16 | More than 10 |
| 90 | 10 | 20 | 60 | 3.5 | 1.32 | 4 |
| 95 | 5 | 20 | 55 | 3.5 | 1.21 | 2 |

[Note]:
*1)Ny 6: Poly-ε-caprolactam
*2)F: Copolymer F

EXAMPLE 4

Polyhexamethylene adipamide (nylon 6.6) (90% by weight) and polyhexamethylene azelamide and polylaurolactam as the γ-type aliphatic polyamide, the above-mentioned Terpolymer A and B as the non-crystalline aliphatic polyamide or the above-mentioned Terpolymer D and E and Copolymer F as the ring-containing polyamide (each 10% by weight) are admixed in a chip state. The mixture is melt-extruded to obtain an unstretched film, which is sequentially and biaxially stretched by the aid of the same extruder and stretching machine as used in Example 1 under the conditions of an extrusion temperature of 285° C., a chill roll temperature of 20° C., a stretching temperature in machine direction of 65° C., a draw ratio in machine direction of 3.5, a stretching temperature in transverse direction of 100° C. and a draw ratio in transverse direction of 3.7 and then is heat-set to give a biaxially stretched film (thickness: 15μ). The film stretched in machine direction has a plane orientation index of 1.05 to 1.60 as shown in Table 9 and shows so good stretchability that it is industrially useful.

Table 9

| Polymer blend with polyhexamethylene adipamide | Plane orientation index | Stretchability | Remark |
|---|---|---|---|
| Polylaurolactam | 1.07 | 1 | α-type aliphatic polyamide |
| Polyhexamethylene azelamide | 1.23 | 2 | " |
| Terpolymer A | 1.56 | 5 | Non-crystalline aliphatic polyamide |
| Terpolymer B | 1.46 | 6 | " |
| Poly(trimethylhexamethylene | 1.09 | 0 | Ring-containing polyamide which |

Table 9-continued

| Polymer blend with poly-hexamethylene adipamide | Plane orientation index | Stretchability | Remark |
|---|---|---|---|
| terephthalamide) | | | does not contain xylylenediamine residue |
| Terpolymer D | 1.21 | 1 | " |
| Terpolymer E | 1.52 | 4 | " |
| Copolymer F | 1.56 | 4 | " |

COMPARATIVE EXAMPLE 1

The same poly-ε-caprolactam as used in Example 1 is melt-extruded to obtain an unstretched film, followed by stretching in machine direction under the conditions as shown in Table 10, and then stretching in transverse direction in the same manner as in Example 1 by the use of the same extruder and stretching machine as used in Example 1. The results are shown in Table 10.

Table 10

| Temperature of chill roll °C | Stretching in machine direction | | Plane orientation index | Stretchability |
|---|---|---|---|---|
| | Temperature (°C) | Draw ratio | | |
| 80 | 90 | 3.5 | 2.31 | More than 10 |
| 80 | 90 | 3.0 | 2.00 | More than 10 |
| 20 | 75 | 3.5 | 1.71 | More than 10 |
| 20 | 65 | 3.5 | 0.81 | 7 |
| 20 | 55 | 3.5 | 0.65 | 10 |
| 50 | 70 | 3.0 | 1.38 | 10 |

EXAMPLE 5

Poly-ε-caprolactam (Ny 6) ($\eta_{rel}$ = 3.1) and polyundecanolactam (Ny 11) and polyhexamethylene adipamide (Ny 6.6) are admixed in chip state in a proportion as shown in Table 11 and 12. The mixture is melt-extruded to obtain an unstretched film, followed by stretching in machine direction under the conditions as shown in Tables 11 and 12 and then stretching in transverse direction in the same manner as in Example 1 by the use of the same extruder and stretching machine as used in Example 1. The results are shown in Table 11 and 12.

Table II

| Mixing proportion of polymers | | Temp. of chill roll (°C) | Stretching in machine direction | | Plane orientation index | Stretchability |
|---|---|---|---|---|---|---|
| Ny 6 | Ny 11 | | Temp. (°C) | Draw Ratio | | |
| 80 | 20 | 20 | 55 | 3.5 | 1.10 | 2 |
| 80 | 20 | 20 | 70 | 3.5 | 1.98 | More than 10 |
| 80 | 20 | 20 | 90 | 3.5 | 1.53 | More than 10 |
| 90 | 10 | 20 | 60 | 3.5 | 1.21 | 4 |

Table 12

| Mixing proportion of polymers | | Temp. of chill roll (°C) | Stretching in machine direction | | Plane orientation index | Stretchability |
|---|---|---|---|---|---|---|
| Ny 6 | Ny 6.6 | | Temp. (°C) | Draw ratio | | |
| 80 | 20 | 20 | 55 | 3.5 | 0.97 | 2 |
| 80 | 20 | 20 | 70 | 3.5 | 1.82 | More than 10 |
| 90 | 10 | 20 | 60 | 3.5 | 0.88 | 4 |

EXAMPLE 6

Component A: nylon 6 ($\eta_{rel}$ = 3.30) in chip form

Component B: a ring-containing polyamide ($\eta_{rel}$ = 2.24, glass transition point: 124° C.) in chip form, which is produced by copolymerizing ε-caprolactam (25 mol %), hexamethylenediammonium adipate (15 mol %), hexamethylenediammonium isophthalate (20 mol %) and hexamethylenediammonium terephthalate (40 mol %).

The above Component A and Component B are admixed in a proportion as shown in Table 13. The mixture is melt-extruded by the aid of an extruder having a T-die at 285° C. onto a chill roll at 35° C. for cooling to obtain an unstretched film having a thickness of about 220μ and a width of about 25 cm. The unstretched film is stretched in machine direction by the aid of a stretching machine comprising multiple rolls (diameter: 110 mm, width: 70 cm) at a velocity of 2 m/minute, and is stretched in transverse direction by the aid of a tenter for stretching in transverse direction (width: about 3 m, length: about 11 m) and then is heat-set in the tenter at 200° C. The results are shown in Table 13.

COMPARATIVE EXAMPLES 2 and 3

A mixture of the same Component A (97.5% by weight) and Component B (2.5% by weight) as used in Example 6 or the Component A alone is subjected to sequential biaxial stretching in the same manner as described in Example 6. As the result, the film is largely broken in the stretching in transverse direction and hence a uniformly stretched film can not be obtained. The results are also shown in Table 13.

Table 13

| Experiments | Mixing proportion of resin | | Stretching temp. (°C) | | Draw ratio | | Plane orientation index | Stretchability |
|---|---|---|---|---|---|---|---|---|
| | A (Ny 6)[1] | B[2] | MD | TD | MD | TD | | |
| 1 | 80 | 20 | 80 | 90 | 3.0 | 3.5 | 1.25 | 1 |
| 2 | 90 | 10 | 75 | 85 | 3.0 | 3.5 | 1.22 | 2 |
| 3 | 95 | 5 | 75 | 85 | 3.0 | 3.5 | 1.46 | 5 |
| Comparative Example 2 | 97.5 | 2.5 | 75 | 85 | 3.0 | 3.5 | 1.83 | >10 |
| Comparative Example 3 | 100 | 0 | 75 | 85 | 3.0 | 3.5 | 1.97 | >10 |

[Note]:
[1]A(Ny 6): Poly-ε-caprolactam
[2]B: Component B
MD: machine direction
TD: transverse direction

EXAMPLE 7

Component A: nylon 6 ($\eta_{rel} = 3.20$) in chip form

Component B: a ring-containing polyamide ($\eta_{rel} = 2.18$) in chip form which is produced by copolymerizing ε-caprolactam (60 mol %), metaxylylenediammonium adipate (25 mol %) and metaxylylenediammonium terephthalate (15 mol %).

The above Component A and Component B are admixed in a proportion as shown in Table 14. The mixture is melt-extruded in the same manner as in Example 1 to obtain an unstretched film having a thickness of about 250μ and a width of about 25 cm. The unstretched film is stretched in machine direction by the aid of a stretching machine comprising multiple rolls (diameter: 110 mm, width: 70 cm) at a velocity of 3 m/minute under the conditions as shown in Table 14, and is stretched in transverse direction by the aid of a tenter for stretching in transverse direction (width: about 3 m, length: about 11 m) and then is heat-set in the tenter at 200° C. for 10 seconds. The results are shown in Table 14.

COMPARATIVE EXAMPLES 4 AND 5

A mixture of the same Component A (97.5% by weight) and Component B (2.5% by weight) as used in Example 7 or the Component A alone extruded and is further subjected to sequential biaxial stretching in the same manner as described in Example 7. As the result, the film is largely broken in the stretching in transverse direction and hence a uniformly stretched film can not be obtained. The results are also shown in Table 14.

Component B: a ring-containing polyamide ($\eta_{rel} = 2.05$, melting point: 167° - 170° C.) in chip form, which is produced by copolymerizing ε-caprolactam (40 mol %), hexamethylenediammonium adipate (15 mol %) and metaxylylenediammonium adipate (45 mol %).

The above Component A and Component B are admixed in a proportion as shown in Table 15. The mixture is melt-extruded at 290° C. onto a chill roll at 60° C. for cooling in the same manner as in Example 6 to obtain an unstretched film having a thickness of about 220μ and a width of about 25 cm. The unstretched film is sequentially and biaxially stretched by the use of the same stretching machine as used in Example 6 under the conditions as shown in Table 15, and then the stretchability of the film is estimated. The results are shown in Table 15. As is made clear from the results, when the Component B is admixed in the ratio of 5% or higher, the film shows the desired sequential stretchability.

Table 15

| Experiments | Polymer composition (% by weight) A(Ny 6.6)*1) | B*2) | Stretching temp. (° C) MD | TD | Draw ratio MD | TD | Plane orientation index | Stretchability |
|---|---|---|---|---|---|---|---|---|
| 1 | 80 | 20 | 75 | 90 | 3.5 | 3.8 | 1.14 | 1 |
| 2 | 90 | 10 | 70 | 85 | 3.5 | 3.8 | 1.21 | 2 |
| 3 | 95 | 5 | 70 | 85 | 3.5 | 3.5 | 1.38 | 4 |
| Comparative Example 6 | 97.5 | 2.5 | 70 | 85 | 3.5 | 3.5 | 1.78 | >10 |
| Comparative Example 7 | 100 | 0 | 70 | 85 | 3.5 | 3.5 | 1.86 | >10 |

[Note]:
*1)A(Ny 6.6):Poly-ε-caprolactam
*2)B:Component B
MD:machine direction
TD:transverse direction

EXAMPLE 9 AND COMPARATIVE EXAMPLE 8

Component A: nylon 6.6 ($\eta_{rel} = 2.85$) in chip form

Component B: a ring-containing polyamide ($\eta_{rel} = 2.08$, melting point: 155° - 160° C.) in chip form, which is produced by copolymerizing ε-caprolactam (55 mol %), hexamethylenediammonium isophthalate (20 mol %) and hexamethylenediammonium terephthalate (25 mol %).

The above Component A and Component B are admixed in a proportion as shown in Table 16. The mixture is melt-extruded by the aid of an extruder (diameter: 60 mm) having a T-die at 290° C. onto a chill roll at 30° C. for cooling to obtain an unstretched film having Table 14

| Experiments | Mixing proportion of resin A(Ny 6)*1) | B*2) | Stretching in machine direction Temperature (° C) | Draw ratio | Stretching in transverse direction Temperature (° C) | Draw ratio | Plane orientation index | Stretchability |
|---|---|---|---|---|---|---|---|---|
| 1 | 80 | 20 | 70 | 3.5 | 85 | 3.8 | 1.10 | 1 |
| 2 | 90 | 10 | 70 | 3.5 | 85 | 3.8 | 1.19 | 1 |
| 3 | 95 | 5 | 70 | 3.5 | 85 | 3.5 | 1.42 | 6 |
| Comparative Example 4 | 97.5 | 2.5 | 70 | 3.5 | 85 | 3.5 | 1.78 | >10 |
| Comparative Example 5 | 100 | 0 | 70 | 3.5 | 85 | 3.5 | 1.86 | >10 |

[Note]:
*1)A(Ny 6):Poly-ε-caprolactam
*2)B:Component B

EXAMPLE 8 AND COMPARATIVE EXAMPLES 6 AND 7

Component A: nylon 6.6 ($\eta_{rel} = 2.85$) in chip form a thickness of about 210μ and a width of about 25 cm. The unstretched film is sequentially and biaxially stretched by the use of the same stretching machine as used in Example 6 under the conditions as shown in Table 16. The results are shown in Table 16.

Table 16

| Experiments | Mixing proportion of polymers A (%)[1] | B (%)[1] | Stretching temp. (°C) MD | TD | Draw ratio MD | TD | Plane orientation index | Stretchability |
|---|---|---|---|---|---|---|---|---|
| 1 | 80 | 20 | 70 | 85 | 3.5 | 3.5 | 1.26 | 2 |
| 1 | 90 | 10 | 70 | 85 | 3.5 | 3.5 | 1.31 | 2 |
| 3 | 95 | 5 | 70 | 85 | 3.5 | 3.5 | 1.50 | 5 |
| Comparative Example 8 | 97.5 | 2.5 | 70 | 85 | 3.5 | 3.5 | 1.78 | >10 |

[Note]:
[1]A: Nylon 6.6 (poly-ε-caprolactam)
[2]B: Component B
MD: machine direction
TD: transverse direction

EXAMPLE 10 AND COMPARATIVE EXAMPLE 9

Component A: nylon 6 ($\eta_{rel}$ = 3.15) in chip form

Component B: an amorphous ring-containing polyamide ($\eta_{rel}$ = 2.20, glass transition point: about 120° C.) in chip form, which is produced by copolymerizing metaxylylenediammonium adipate (25 mol %) and trimethylhexamethylenediammonium terephthalate (75 mol %).

The above Component A and Component B are admixed in a proportion as shown in Table 17. The mixture is melt-extruded by the aid of an extruder having a T-die at 285° C. onto a chill roll at 30° C. for cooling to obtain an unstretched film having a thickness of about 220μ and a width of about 25 cm. The unstretched film is sequentially and biaxially stretched in the same manner as in Example 6 under the conditions as shown in Table 17 and then is heat-set in the tenter with tension at 200° C. for 10 seconds to give a biaxially stretched film. The stretchability thereof is shown in Table 17. As is made clear from the results, in case Component B is used in an amount of 2.5% by weight (Comparative Example 9), the stretchability thereof is not good.

COMPARATIVE EXAMPLE 10

The same Component A as used in Example 10 is melt-extruded in the same manner as in Example 10 to obtain an unstretched film having a thickness of about 220μ and a width of about 25 cm. The unstretched film is sequentially and biaxially stretched in the same manner as in Example 10, but the film is largely broken in the stretching in transverse direction, and hence, a uniform film can not be obtained.

COMPARATIVE EXAMPLE 11

The unstretched film produced in the above Comparative Example 10 is subjected to simulataneous biaxial stretching by the use of a film stretcher made by T. M. Long Co. (U.S.A.) under the conditions as shown in Table 17, and then is heat-set with tension at 200° C. for 10 seconds. The results are also shown in Table 17.

Besides, the physical properties of the biaxially stretched films produced in Example 10 and in Comparative Examples 9 and 11 are shown in Table 18.

Table 17

| Experiment | Mixing proportion of polymers A(Ny 6)[1] | B[2] | Stretching temp. (°C) MD | TD | Draw ratio MD | TD | Plane orientation index | Stretchability |
|---|---|---|---|---|---|---|---|---|
| 1 | 80 | 20 | 75 | 90 | 3.5 | 3.8 | 1.31 | 1 |
| 2 | 90 | 10 | 70 | 85 | 3.5 | 3.8 | 1.26 | 2 |
| 3 | 95 | 5 | 70 | 85 | 3.5 | 3.5 | 1.43 | 7 |
| Comparative Example 9 | 97.5 | 2.6 | 70 | 85 | 3.5 | 3.5 | 1.78 | >10 |
| Comparative Example 10 | 100 | 0 | 70 | 85 | 3.5 | 3.5 | 1.86 | >10 |
| Comparative Example 11 | 100 | 0 | 85 | | 3.5 | | — | Good |

[Note]:
[1]A (Ny 6):Poly-ε-caprolactam
[2]B:Component B

Table

| Experiments | Thickness (μ) | Yield strength (kg/mm²) MD | TD | Yield elongation in tension (%) MD | TD | Tensile strength at break (kg/mm²) MD | TD | Elongation at break (%) MD | TD | Impact strength (kg cm/25μ) Initial | After treatment with hot water | Degree of light transmission (%) |
|---|---|---|---|---|---|---|---|---|---|---|---|---|
| 1 | 15 | 4.2 | 3.9 | 3.6 | 3.9 | 24.8 | 21.7 | 75 | 90 | 13.8 | 6.5 | 93 |
| 2 | 17 | 3.8 | 3.5 | 3.3 | 3.5 | 23.4 | 22.0 | 69 | 87 | 14.3 | 5.7 | 92 |
| 3 | 19 | 3.5 | 3.1 | 3.4 | 3.3 | 21.3 | 19.5 | 88 | 96 | 13.6 | 4.8 | 91 |
| Comparative Example 9 | 20 | 3.2 | 3.0 | 3.2 | 3.4 | 19.7 | 18.8 | 91 | 110 | 12.9 | 4.2 | 90 |
| Comparative Example 11 | 20 | 3.2 | 2.8 | 3.3 | 3.5 | 18.2 | 18.0 | 93 | 99 | 10.5 | 3.8 | 88 |

[Note]:
It was treated with hot water at 120° C for 30 minutes in a pressure vessel.

EXAMPLE 11

Component A: nylon 6 ($\eta_{rel}$ = 3.10) in chip form

Component B: a ring-containing polyamide ($\eta_{rel}$ = 2.14, melting point: 160° – 165° C.) in chip form, which is produced by copolymerizing ε-caprolactam (60 mol), terephthalic acid (31 mol), isophthalic acid (10 mol), metaxylylenediamine (10 mol) and hexamethylenediamine (30 mol).

The above Component A and Component B are admixed in a proportion as shown in Table 19. The mixture is melt-extruded in the same manner as in Example 6 to obtain an unstretched film having a thickness of about 230μ. The unstretched film is guided to a longitudinal stretching machine at a velocity of 2 m/minute and stretched in machine direction under the conditions as shown in Table 19 and then is stretched in transverse direction by the aid of a transverse stretching tenter and is heat-set in the tenter with tension at 200° C. for 15 seconds. The results are shown in Table 19.

Table 19

| Experiments | Mixing proportion of resin | | Stretching temp. (° C) | | Draw ratio | | Stretch-ability |
|---|---|---|---|---|---|---|---|
| | A (Ny 6)[*1] | B[*2] | MD | TD | MD | TD | |
| 1 | 80 | 20 | 70 | 85 | 3.5 | 3.8 | 2 |
| 2 | 90 | 10 | 70 | 85 | 3.5 | 3.8 | 3 |
| 3 | 95 | 5 | 70 | 85 | 3.5 | 3.5 | 5 |

[Note]:
[*1] A (Ny 6): Poly-ε-caprolactam
[*2] B: Component B
MD: machine direction
TD: transverse direction

EXAMPLE 12 AND COMPARATIVE EXAMPLE 12

The same poly-ε-caprolactam as used in Example 1 as component A and the polyamide as shown in Table 20 as component B are admixed in chip form in a proportion as shown in Table 21. The mixture is heated at 270° C. and melt-extruded by the aid of an extruder (diameter: 20 mm) having a T-die onto a chill roll kept at a designed temperature as shown in Table 21 for cooling to obtain an unstretched film having a thickness of about 250μ and a width of 12 cm. The unstretched film is sequentially and biaxially stretched in two directions being at a right angle each other by the aid of a film stretcher made by T. M. Long Co. (U.S.A.) and then is heat-set at 200° C. for 30 seconds to give a uniform, transparent film without breaking. The properties of the film thus obtained are shown in Table 22.

As Comparative Example 12, only the poly-ε-caprolactam is melt-extruded and then is sequentially and biaxially stretched in the same manner as described above. As the result, in the stretching in transverse direction, breaking of the film occurs or partial necking remains and a uniform film can not be obtained. Accordingly, the unstretched film is stretched by simultaneous biaxial stretching. The results are also shown in Table 22.

Table 20

| | Component B |
|---|---|
| B-1 | Polyhexamethylene azelamide (Ny 6.9) |
| B-2 | Polylaurolactam (Ny 12) |
| B-3 | Terpolymer A used in Example 2 |
| B-4 | Poly(trimethylhexamethylene terephthalamide) |
| B-5 | Polyundecalactam (Ny 11) |
| B-6 | Polyamide used in Example 6 |
| B-7 | Polyamide used in Example 7 |
| B-8 | Polyamide used in Example 8 |
| B-9 | Polyamide used in Example 9 |
| B-10 | Polyamide used in Example 10 |
| B-11 | Polyamide used in Example 11 |

Table 21

| Experiments | Mixing proportion of polymer | | Temp. of Chill roll (° C) | Stretching in machine direction | | Stretching in transverse direction | |
|---|---|---|---|---|---|---|---|
| | Component A | Component B | | Temp. (° C) | Draw ratio | Temp. (° C) | Draw ratio |
| 1 | 80 | (B-1) 20 | 20 | 90 | 3.5 | 90 | 3.5 |
| 2 | 80 | (B-2) 20 | 20 | 80 | 3.5 | 80 | 3.5 |
| 3 | 80 | (B-3) 20 | 20 | 90 | 3.5 | 90 | 3.5 |
| 4 | 90 | (B-4) 10 | 30 | 90 | 3.5 | 90 | 3.5 |
| 5 | 80 | (B-5) 20 | 20 | 90 | 3.5 | 90 | 3.5 |
| 6 | 90 | (B-6) 10 | 20 | 90 | 3.5 | 90 | 3.5 |
| 7 | 90 | (B-7) 10 | 30 | 80 | 3.5 | 80 | 3.5 |
| 8 | 90 | (B-8) 10 | 30 | 90 | 3.5 | 90 | 3.5 |
| 9 | 90 | (B-9) 10 | 20 | 100 | 3.5 | 100 | 3.5 |
| 10 | 90 | (B-10) 10 | 20 | 90 | 3.5 | 90 | 3.5 |
| 11 | 90 | (B-11) 10 | 20 | 90 | 3.5 | 90 | 3.5 |
| Comparative Example 12 | 100 | 0 | 20 | Simultaneously biaxially stretched at 90° C in a draw ratio of 3.5 × 3.5 | | | |

Table 22

| Experiments | Clarity (Haze) (%) | Yield strength (kg/mm²) | | Yield elongation in tension (%) | | Tensile strength at break (kg/mm²) | | Elongation at break (%) | | Young's modulus (kg/mm²) | |
|---|---|---|---|---|---|---|---|---|---|---|---|
| | | MD | TD | MD | TD | MD | TD | MD | TD | MD | TD |
| 1 | 1.3 | 3.6 | 4.2 | 4.2 | 4.0 | 21.0 | 23.5 | 90 | 87 | 151 | 165 |
| 2 | 1.2 | 3.3 | 3.8 | 3.8 | 3.6 | 19.2 | 21.0 | 98 | 88 | 141 | 154 |
| 3 | 1.3 | 3.2 | 3.7 | 3.8 | 3.6 | 19.8 | 21.5 | 102 | 92 | 132 | 149 |
| 4 | 0.8 | 5.0 | 5.8 | 5.2 | 4.8 | 22.5 | 24.2 | 91 | 81 | 185 | 196 |
| 5 | 1.3 | 3.3 | 3.8 | 4.0 | 3.8 | 20.3 | 21.8 | 90 | 78 | 130 | 151 |
| 6 | 1.0 | 4.1 | 5.0 | 4.8 | 4.2 | 21.3 | 23.6 | 103 | 91 | 196 | 223 |
| 7 | 0.8 | 3.2 | 3.5 | 3.8 | 3.6 | 20.9 | 22.8 | 111 | 96 | 172 | 180 |
| 8 | 0.8 | 3.4 | 3.6 | 3.9 | 3.6 | 21.1 | 24.2 | 104 | 89 | 165 | 178 |
| 9 | 0.8 | 4.2 | 5.2 | 4.6 | 4.2 | 22.6 | 25.8 | 106 | 92 | 188 | 209 |
| 10 | 1.0 | 4.6 | 5.5 | 4.8 | 4.3 | 22.2 | 25.1 | 112 | 98 | 195 | 220 |
| 11 | 1.0 | 4.5 | 5.0 | 4.6 | 4.2 | 22.7 | 25.9 | 109 | 91 | 187 | 211 |
| Comparative Example 12 | 1.5 | 3.0 | 3.2 | 3.3 | 3.5 | 18.0 | 18.2 | 93 | 99 | 125 | 140 |

Table 22-continued

| Experiments | Dry heat shrink (%) 180° C, 30 min. | Boiling water shrink (%) Boiling for 30 min. | Impact strength (kg cm/25 μ) 20° C | Impact strength (kg cm/25 μ) 30°° C | Oxygen-permeability (cc/m²/24 Hr) 0% RH*⁾ | Oxygen-permeability (cc/m²/24 Hr) 90% RH*⁾ |
|---|---|---|---|---|---|---|
| 1 | 1.8 | 1.3 | 11.5 | 5.5 | 25 | 60 |
| 2 | 1.8 | 1.4 | 11.8 | 5.8 | 27 | 70 |
| 3 | 2.0 | 1.5 | 11.6 | 5.6 | 22 | 75 |
| 4 | 3.5 | 2.0 | 13.8 | 8.0 | 20 | 55 |
| 5 | 1.8 | 1.3 | 11.5 | 6.0 | 24 | 60 |
| 6 | 2.0 | 1.5 | 12.8 | 8.5 | 22 | 50 |
| 7 | 2.0 | 1.5 | 13.5 | 8.6 | 20 | 52 |
| 8 | 3.0 | 2.0 | 13.8 | 8.5 | 20 | 50 |
| 9 | 3.0 | 2.0 | 14.0 | 9.0 | 23 | 50 |
| 10 | 3.0 | 2.0 | 13.5 | 8.6 | 25 | 53 |
| 11 | 2.0 | 1.5 | 12.6 | 7.2 | 25 | 50 |
| Comparative Example 12 | 2.0 | 1.5 | 11.0 | 4.5 | 30 | 90 |

[Note]:
*⁾RH: Relative humidity
MD: machine direction
TD: transverse direction

Thus, according to the present invention, the polymer blend can be sequentially and biaxially stretched with significant improvement of the stretchability, and the biaxially stretched film has more excellent properties in comparison with the biaxialy stretched film obtained by simultaneous biaxialy stretching as shown in the above Table 22, and hence the biaxially stretched film of the present invention is suitable for various utilities as mentioned hereinbefore.

What is claimed is:

1. A process for preparing a biaxially stretched film of a polyamide blend, which comprises melt extruding a polyamide blend to make an unstretched film and stretching the unstretched film firstly in a machine direction at a temperature of 50° to 130° C. in a draw ratio of 2 to 5 and secondly in a transverse direction at a temperature of 70° to 160° C. in a draw ratio of 2 to 5,
    (a) said polyamide blend comprising 97 to 80% by weight of an α-type aliphatic polyamide,
    (b) and 3 to 20% by weight of at least one polyamide selected from the group consisting of:
        (i) an α-type aliphatic polyamide different from the polyamide in (a),
        (ii) a γ-type aliphatic polyamide,
        (iii) a non-crystalline aliphatic polyamide, and
        (iv) a ring-containing polyamide which contains in the molecule 0 to 50 mol % of repeating units comprising a xylylenediamine residue.

2. The process according to claim 1, which comprises stretching an unstretched film of polyamide blend to make a uniaxially stretched film having a plane orientation index of about 0.6 to 1.7 and then stretching the uniaxially stretched film in a direction substantilly at a right angle to the direction at the previous stretching, said polyamide blend comprising
    (a) 97 to 80% by weight of an α-type aliphatic polyamide comprising ε-caprolactam and/or an α-type aliphatic polyamide comprising hexamethylene adipamide,
    (b) and 3 to 20% by weight of at least one polyamide selected from the group consisting of
        (i) an α-type aliphatic polyamide different from the polyamide in (a),
        (ii) a γ-type aliphatic polyamide,
        (iii) a non-crystalline aliphatic polyamide, and
        (iv) a ring-containing polyamide which contains in the molecule 0 to 50 mol % of repeating units comprising a xylylenediamine residue.

3. The process according to claim 2, wherein the plane orientation index of the uniaxially stretched film is in the range of 0.8 to 1.3.

4. The process according to claim 1, wherein the polyamide in (b), (i) is a member selected from the group consisting of nylon 6, nylon 6.6, nylon 11, nylon 6.10, and a copolymer comprising the monomeric constituents of those polymers, which forms α-form crystals.

5. The process according to claim 1, wherein the polyamide in (b), (ii) is a member selected from the group consisting of nylon 6.7, nylon 6.9, nylon 12 and a copolymer comprising the monomeric constituents of those polymers, which forms α-form crystals.

6. The process according to claim 1, wherein the polyamide in (b), (ii) is nylon 12.

7. The process according to claim 1, wherein the polyamide in (b), (iv) is a copolyamide containing 70 mol % or more of repeating units comprising
    (a) 0 to 80 mol % of ε-caprolactam,
    (b) 3 to 100 mol % of units comprising at least one aliphatic diamine and at least one aromatic dicarboxylic acid and/or alicyclic dicarboxylic acid and
    (c) 0 to 70 mol % of units comprising metaxylylenediamine containing 0 to 30 mol % of paraxylylenediamine and at least one aromatic dicarboxylic acid and/or alicyclic dicarboxylic acid.

8. The process according to claim 7, wherein the component (b) constituting the copolyamide repeating units comprises 65 mol % or more of units comprising 2,2,4-trimethylhexamethylenediamine and or 2,4,4-trimethylhexamethylenediamine and terephthalic acid, and the components (a) and (c) are totally 35 mol % or less.

9. The process according to claim 8, wherein the molar ratio of 2,4,4-trimethylhexamethylenediamine and 2,4,4-trimethylhexamethylenediamine is about 1:1.

10. The process according to claim 1, wherein the polyamide in (b) is a copolyamide containing 70 mol % or more of repeating units comprising
    (a) 0 to 80 mol % of ε-caprolactam,
    (b) 0 to 50 mol % of units comprising metaxylylenediamine containing 0 to 30 mol % of paraxylylenediamine and at least one aliphatic dicarboxylic acid having 4 to 12 carbon atoms, and
    (c) 0 to 70 mol % of a member selected from the group consisting of
        (i) units comprising at least one aliphatic diamine having 2 to 12 carbon atoms and at least one aliphatic dicarboxylic acid having 4 to 36 carbon atoms, (ii) units comprising at least one aliphatic diamine having 2 to 12 carbon atoms and at least one aromatic dicarboxylic acid and/or alicyclic dicarboxylic acid, and (iii) units comprising metaxylylenediamine and at least one aromatic dicarboxylic acid and/or alicyclic dicarboxylic acid.

11. The process according to claim 10, wherein the component (a) is contained in the range of 20 to 50 mol %, the component (b) is contained in the range of 10 to 40 mol % and the component (c) is contained in the range of 20 to 70 mol %.

12. The process according to claim 10, wherein the aliphatic dicarboxylic acid in the component (c), (i) has 6 to 12 carbon atoms.

13. The process according to claim 1, wherein the polyamide in (b), (iv) is a copolyamide containing 70 mol % or more of the repeating units comprising (a) 5 to 80 mol % of the units comprising ε-caprolactam or the units comprising at least one aliphatic diamine and at least one aliphatic dicarboxylic acid, (b) 0 to 90 mol % of the units comprising at least one aliphatic diamine and isophthalic acid, and (c) 0 to 80 mol % of the units comprising at least one aliphatic diamine and terephthalic acid.

14. The process according to claim 13, wherein the component (a) consists of units comprising ε-caprolactam or hexamethylene adipamide, the aliphatic diamine in the components (b) and (c) is hexamethylenediamine and the component (a) is contained in the range of 15 to 65 mol %, the component (b) is contained in the range of 15 to 75 mol % and the component (c) is contained in the range of 10 to 60 mol %.

15. The process according to claim 1, wherein the polyamide in (b), (iv) is a copolyamide containing 70 mol % or more of repeating units comprising (a) 3 to 80 mol % of ε-caprolactam, (b) 3 to 80 mol % of units comprising at least one aliphatic diamine having 2 to 12 carbon atoms and at least one aliphatic dicarboxylic acid having 4 to 36 carbon atoms, and (c) 3 to 90 mol % of units comprising at least one diamine and at least one aromatic dicarboxylic acid and/or alicyclic dicarboxylic acid.

16. The process according to claim 15, wherein the component (a) is contained in the range of 20 to 50 mol %, the component (b) is contained in the range of 20 to 40 mol % and the component (c) is contained in the range of 40 to 70 mol %.

17. The process according to claim 1, wherein the polyamide in (b), (iv) is a copolyamide containing 70 mol % or more of the repeating units comprising amine components consisting of (a) 3 to 70 mol % (in the amine components) of metaxylylenediamine containing 0 to 30% mol % of paraxylylenediamine and (b) 97 to 30 mol % (in the amine components) of at least one aliphatic diamine having 2 to 12 carbon atoms, and carboxylic acid components consisting of (c) 10 to 97 mol % (in the carboxylic acid components) of at least one aliphatic dicarboxylic acid having 4 to 36 carbon atoms and (d) 90 to 3 mol % (in the carboxylic acid components) of at least one aromatic dicarboxylic acid or alicyclic dicarboxylic acid.

18. The process according to claim 17, wherein the component (a) is contained in the range of 10 to 50 mol %, the component (b) is contained in the range of 90 to 50 mol %, the component (c) is contained in the range of 20 to 90 mol % and the component (d) is contained in the range of 80 to 10 mol %.

19. The process according to claim 2, wherein the unstretched film of polyamide blend is firstly stretched in the machine direction and secondly in a transverse direction.

20. The process according to claim 19, wherein the second stretching in a transverse direction is carried out at a temperature of 80° to 130° C. in a draw ratio of 2 to 5.

21. A process according to claim 1, wherein the polyamide blend comprises 97 to 80% by weight of an α-type aliphatic polyamide and 3 to 20% by weight of a different α-type aliphatic polyamide.

22. A process according to claim 1, wherein the polyamide blend comprises 97 to 80% by weight of an α-type aliphatic polyamide and 3 to 20% by weight of an γ-type aliphatic polyamide.

23. A process according to claim 1, wherein the polyamide blend comprises 97 to 80% by weight of an α-type aliphatic polyamide and 3 to 20% by weight of a non-crystalline aliphatic polyamide.

24. A process according to claim 1, wherein the polyamide blend comprises 97 to 80% by weight of an α-type aliphatic polyamide and 3 to 20% by weight of a ring-containing polyamide which contains in the molecule 0 to 50 mol % of repeating units comprising a xylylenediamine residue.

25. A process according to claim 1, wherein the polyamide blend comprises:

(a) 97 to 80% by weight of an α-type aliphatic polyamide, and (b) 3 to 20% by weight of at least one polyamide selected from the group consisting of:

(i) an α-type aliphatic polyamide different from the polyamide in (a), (ii) a γ-type aliphatic polyamide, and (iii) a non-crystalline aliphatic polyamide.

* * * * *